United States Patent
Atungsiri et al.

(10) Patent No.: US 11,018,923 B2
(45) Date of Patent: *May 25, 2021

(54) INTERLEAVING ASPECTS IN SIGNAL SPACE DIVERSITY OVERLAPPED WITH NON-ORTHOGONAL COLLIDING TRANSMISSIONS

(71) Applicant: Sony Corporation, Tokyo (JP)

(72) Inventors: Samuel Asangbeng Atungsiri, Basingstoke (GB); Martin Warwick Beale, Basingstoke (GB); Shin Horng Wong, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/795,582

(22) Filed: Feb. 20, 2020

(65) Prior Publication Data

US 2020/0195486 A1 Jun. 18, 2020

Related U.S. Application Data

(63) Continuation of application No. 16/334,359, filed as application No. PCT/EP2017/073508 on Sep. 18, 2017, now Pat. No. 10,581,662.

(30) Foreign Application Priority Data

Sep. 30, 2016 (EP) .................................... 16191997

(51) Int. Cl.
*H04L 27/34* (2006.01)
*H04L 1/00* (2006.01)
(Continued)

(52) U.S. Cl.
CPC ....... *H04L 27/3405* (2013.01); *H04B 1/0475* (2013.01); *H04B 7/02* (2013.01); *H04B 7/022* (2013.01); *H04B 7/0697* (2013.01); *H04J 11/003* (2013.01); *H04L 1/0071* (2013.01); *H04L 27/3444* (2013.01)

(58) Field of Classification Search
CPC ............. H04L 27/3405; H04L 27/3444; H04L 1/0071; H04L 27/3488; H04L 1/0041;
(Continued)

(56) References Cited

U.S. PATENT DOCUMENTS

2010/0120467 A1 5/2010 Auranen et al.
2012/0327879 A1* 12/2012 Stadelmeier .......... H04L 5/0042
370/329
(Continued)

FOREIGN PATENT DOCUMENTS

| EP | 2523412 A2 | 11/2012 |
| EP | 2523412 A3 | 4/2016 |
| WO | 2018/050431 A1 | 3/2018 |

OTHER PUBLICATIONS

Cai et al.(Multi-dimensional SCMA Codebook Design Based on Constellation Rotation and Interleaving, 2016 IEEE) (Year: 2016).*
(Continued)

*Primary Examiner* — Ted M Wang
(74) *Attorney, Agent, or Firm* — Xsensus, LLP

(57) ABSTRACT

Interleaving aspects in the case of Signal Space Diversity (SSD) are considered here, in particular when the SSD transmission is expected to be overlapped by a colliding non-orthogonal Ultra Reliable & Low Latency Communication (URLLC). The interleaver's depth when interleaving I and Q components of a rotated modulated symbol is chosen such that a gap of at least an expected maximum size, measured in transmission units, of a possible colliding wireless signal, is generated between a respective In and Qn component of a same symbol n.

18 Claims, 6 Drawing Sheets

(51) Int. Cl.
  *H04B 7/022* (2017.01)
  *H04B 7/06* (2006.01)
  *H04B 7/02* (2018.01)
  *H04J 11/00* (2006.01)
  *H04B 1/04* (2006.01)

(58) Field of Classification Search
  CPC ........ H04B 1/0475; H04B 7/02; H04B 7/022; H04B 7/0697; H04J 11/003
  See application file for complete search history.

(56) References Cited

U.S. PATENT DOCUMENTS

2013/0039303 A1    2/2013    Stadelmeier et al.
2014/0011506 A1    1/2014    McNamara et al.

OTHER PUBLICATIONS

Zhang et al, "Downlink Non-Orthogonal Multiple Access (NOMA) Constellation Rotation", 5 pages.

Huawei et al., "Overview of non-orthogonal multiple access for 5G", 3GPP TSG RAN WG1 Meeting No. 84bis R1-162153, Busan Korea, Apr. 11-15, 2016, 8 pages.

Sony, "Signal Space Diversity for NR", 3GPP TSG RAN WG1 Meeting No. 86, R1-1608936, Lisbon Portugal, Sep. 10-14, 2016, 6 pages.

3GPP, "Technical Specification Group Radio Access Network; Study on Downlink Multiuser Superposition Transmission (MUST) for LTE", Release 13, 3GPP TR 36.859 V1.0.1, Nov. 2015, pp. 1-47.

Holma et al., "LTE for UMTS OFDMA and SC-FDMA Based Radio Access", Wiley 2009, System Architecture Based on 3GPP SAE, 11 pages.

Boutros et al, "Signal Space Diversity: A Power- and Bandwidth-Efficient Diversity Technique for the Rayleigh Fading Channel", IEEE Transactions on Information theory, vol. 44, No. 4, Jul. 1998, pp. 1453-1467.

NTT Docomo, "New SID Proposal: Study on New Radio Access Technology", 3GPP TSG RAN Meeting No. 71 RP-160671, Göteborg, Sweden, Mar. 7-10, 2016, 8 pages.

International Search Report dated Dec. 6, 2017 for PCT/EP2017/073508 filed on Sep. 18, 2017, 12 pages.

* cited by examiner

RE | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |

I | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
Q | 7 | 8 | 9 | 10 | 11 | 12 | 13 | 14 | 15 | 16 | 17 | 18 | 19 | 20 | 21 | 22 | 23 | 24 | 25 | 1 | 2 | 3 | 4 | 5 | 6 |

URLLC | X | X | X | X | X | X |

I | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
Q | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | high I                                             X X X X X X
high Q                         X X X X X X
I & Q   X X X X X X X X X X                                      X X X // INTERLEAVING ASPECTS IN SIGNAL SPACE DIVERSITY OVERLAPPED WITH NON-ORTHOGONAL COLLIDING TRANSMISSIONS

CROSS-REFERENCE TO RELATED APPLICATIONS

The present application is a continuation of U.S. application Ser. No. 16/334,359, filed Mar. 19, 2019, which is based on PCT filing PCT/EP2017/073508, filed Sep. 18, 2017, which claims priority to EP 16191997.2, filed Sep. 30, 2016, the entire contents of each are incorporated herein by reference.

FIELD

The present disclosure relates to wireless telecommunications apparatuses and methods.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks will be expected to efficiently support communications with a much wider range of devices associated with a wider range of data traffic profiles, for example including reduced complexity devices, machine type communication devices, high resolution video displays and virtual reality headsets. Some of these different types of devices may be deployed in very large numbers, for example low complexity devices for supporting the "The Internet of Things", and may typically be associated with the transmissions of relatively small amounts of data with relatively high latency tolerance, whereas other types of device, for example supporting high-definition video streaming, may be associated with transmissions of relatively large amounts of data with relatively low latency tolerance.

There is therefore expected to be a desire for future wireless communications networks, which may be referred to as 5G or new radio (NR) system/new radio access technology (RAT), networks, to efficiently support connectivity for a wide range of devices associated with different applications with different characteristic data traffic profiles, resulting in different devices having different operating characteristics/requirements, such as:

High latency tolerance
High data rates
Millimetre wave spectrum use
High density of network nodes (e.g. small cell and relay nodes)
Large system capacity
Large numbers of devices (e.g. MTC devices/Internet of Things devices)
High reliability (e.g. for vehicle safety applications, such as self-driving cars).
Low device cost and energy consumption
Flexible spectrum usage
Flexible mobility
Ultra-reliable and Low latency A 3GPP Study Item (SI) on New Radio Access Technology (NR) [1] has been proposed for studying and developing a new Radio Access Technology (RAT) for such a next generation wireless communication system. The new RAT is expected to operate in a large range of frequencies and it is expected to cover a broad range of use cases. Example use cases that are considered under this SI are:

Enhanced Mobile Broadband (eMBB)
Massive Machine Type Communications (mMTC)
Ultra Reliable & Low Latency Communications (URLLC)

eMBB services are typically high capacity services with a requirement to support up to 20 Gb/s. For efficient transmission of large amounts of data at high throughput, eMBB services are expected to use a long scheduling time so as to minimise the overhead, where scheduling time refers to the time available for data transmission between allocations. In other words, eMBB services are expected to have relatively infrequent allocation messages and to have longer time period allocated to data transmission in-between allocation messages.

On the other hand URLLC services are low latency services, wherein the latency is measured from the ingress of a layer 2 packet to its egress from the network, with a proposed target of 1 ms. URLLC data is generally expected to be short such that smaller scheduling times are generally expected compared to eMBB transmissions. As the skilled person will understand, eMBB transmissions and URLLC transmissions have different requirements and expectations, wherein high capacity and low overhead is desired for one while low latency is desired for the other.

It is therefore challenging to conceive a system which can accommodate both needs and where these two very different types of transmissions can be transmitted in a satisfactory manner. In view of this, there is a desire to provide arrangements and systems where high capacity and low latency transmissions can be communicated at the same time while trying to optimise resources utilisation for the system as a whole and for each type of transmission. In particular, in cases where there is a conflict between two transmissions, it could be beneficial to provide an arrangement where the potential negative impact of an urgent transmission on an existing transmission can be reduced.

SUMMARY

The present disclosure can assist addressing or mitigating at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLES

Figure 1:
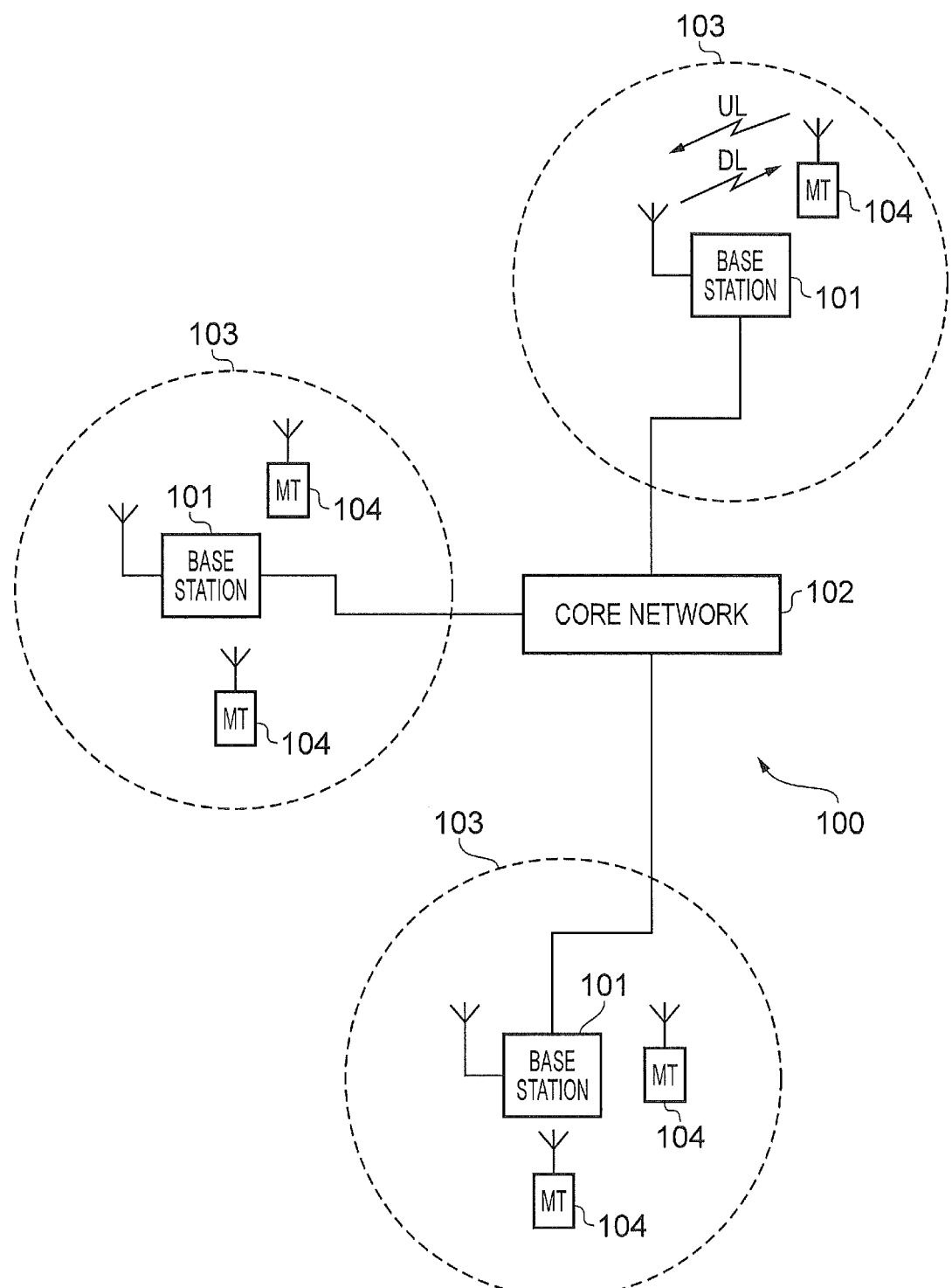
FIG. 1 schematically represents some elements of a conventional LTE-based mobile telecommunications network/system.

FIG. 1 is a schematic diagram illustrating a network architecture for an LTE-based wireless mobile telecommunications network/system 100. Various elements of FIG. 1 and their respective modes of operation are well-known and defined in the relevant standards administered by the 3GPP® body, and also described in many books on the subject, for example, Holma H. and Toskala A [2]. It will be appreciated that operational aspects of the telecommunications network represented in FIG. 1, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment, may also be referred to as transceiver stations/nodeBs/e-nodeBs, and so forth.

Figure 2:
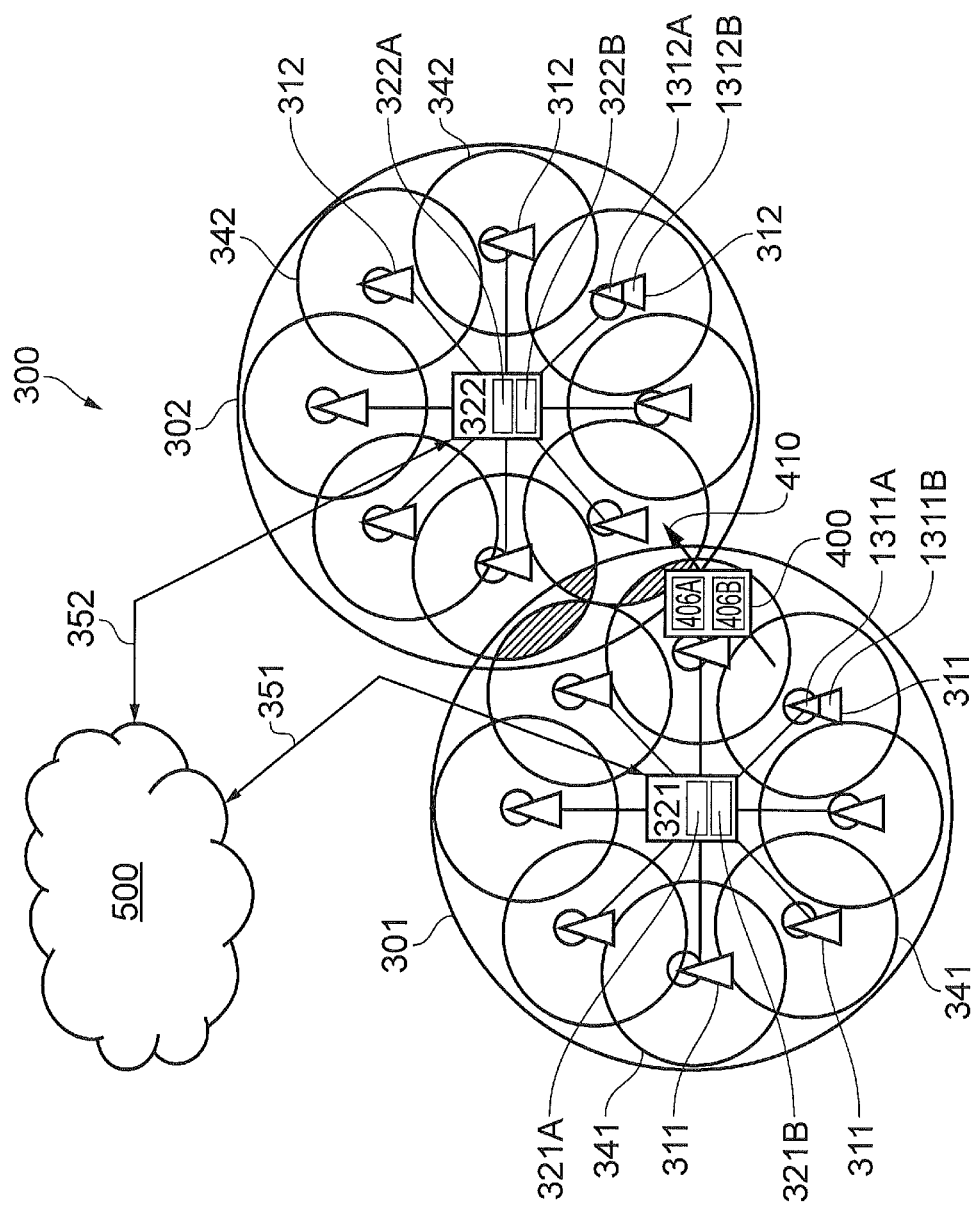
FIG. 2 schematically represents some elements of another type of wireless telecommunications network/system.

FIG. 2 is a schematic diagram illustrating a network architecture for a new RAT wireless mobile telecommunications network/system 300 based on previously proposed approaches and which may be adapted to provide functionality in accordance with embodiments of the disclosure described herein. The new RAT network 300 represented in FIG. 2 comprises a first communication cell 301 and a second communication cell 302. Each communication cell 301, 302, comprises a controlling node (centralised unit) 321, 322 in communication with a core network component 500 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links.

The distributed units 311, 312 are responsible for providing the radio access interface for terminal devices connected to the network. Each distributed unit 311, 312 has a coverage area (radio access footprint) 341, 342 which together define the coverage of the respective communication cells 301, 302.

In terms of broad top-level functionality, the core network component 500 of the new RAT telecommunications system represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to base stations of FIG. 1.

A terminal device 400 is represented in FIG. 2 within the coverage area of the first communication cell 301. This terminal device 400 may thus exchange signalling with the first controlling node 321 in the first communication cell via one of the distributed units 311 associated with the first communication cell 301. For simplicity the present description assumes communications for a given terminal device are routed through one of the distributed units, but it will be appreciated in some implementations communications associated with a given terminal device may be routed through more than one distributed unit, for example in a soft handover scenario and other scenarios. That is to say, references herein to communications being routed through one of the distributed units should be interpreted as references to communications being routed through one or more of the distributed units. In this regard, the particular distributed units through which a terminal device is currently connected through to the associated controlling node may be referred to as active distributed units for the terminal device. The active subset of distributed units for a terminal device may comprise one or more than one distributed units (TRPs). The controlling node 321 is responsible for determining which of the distributed units 311 spanning the first communication cell 301 is responsible for radio communications with the terminal device 400 at any given time (i.e. which of the distributed units are currently active distributed units for the terminal device). Typically this will be based on measurements of radio channel conditions between the terminal device 400 and respective ones of the distributed units 311. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In the example of FIG. 2, two communication cells 301, 302 and one terminal device 400 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein for handling mobility/handovers in a wireless telecommunications system may also be applied in respect of wireless telecommunications systems having different architectures. That is to say, the specific wireless telecommunications architecture for a wireless telecommunications system adapted to implement functionality in accordance with the principles described herein is not significant to the principles underlying the described approaches.

The terminal device 400 comprises a transceiver unit 400A for transmission and reception of wireless signals and a processor unit 400B configured to control the terminal device 400. The processor unit 400B may comprise various sub-units for providing functionality in accordance with embodiments of the present disclosure as explained further herein. These sub-units may be implemented as discrete hardware elements or as appropriately configured functions of the processor unit. Thus the processor unit 400B may comprise a processor unit which is suitably configured/programmed to provide the desired functionality described herein using conventional programming/configuration techniques for equipment in wireless telecommunications systems. The transceiver unit 400A and the processor unit 400B are schematically shown in FIG. 2 as separate elements for ease of representation. However, it will be appreciated that the functionality of these units can be provided in various different ways, for example using a single suitably programmed general purpose computer, or suitably configured application-specific integrated circuit(s)/circuitry. It will be appreciated the terminal device 400 will in general comprise various other elements associated with its operating functionality, for example a power source, user interface, and so forth, but these are not shown in FIG. 2 in the interests of simplicity.

The first and second controlling nodes 321, 322 in this example are functionally identical but serve different geographical areas (cells 301, 302). Each controlling node 321, 322 comprises a transceiver unit 321A, 322A for transmission and reception of communications between the respective controlling nodes 321, 322 and distributed units 311, 312 within their respective communication cells 301, 302 (these communications may be wired or wireless). Each controlling node 321, 322 further comprises a processor unit 321B, 322B configured to control the controlling node 321, 322 to operate in accordance with embodiments of the present disclosure as described herein. The respective processor units 321B, 322B may again comprise various sub-units for providing functionality in accordance with embodiments of the present disclosure as explained herein. These sub-units may be implemented as discrete hardware elements or as appropriately configured functions of the processor unit. Thus, the respective processor units 321B, 322B may comprise a processor unit which is suitably configured/programmed to provide the desired functionality described herein using conventional programming/configuration techniques for equipment in wireless telecommunications systems. The respective transceiver units 321A, 322A and processor units 321B, 322B for each controlling node 321, 322 are schematically shown in FIG. 2 as separate elements for ease of representation. However, it will be appreciated the functionality of these units can be provided in various different ways, for example using a single suitably programmed general purpose computer, or suitably configured application-specific integrated circuit(s)/circuitry. It will be appreciated the controlling nodes 321, 322 will in general comprise various other elements, for example a power supply, associated with their operating functionality.

The respective distributed units (TRPs) 311, 312 in this example are functionally identical but serve different parts of their respective cells. That is to say, the distributed units are spatially distributed through their respective communication cells to support communications for terminal devices at different locations within the cells, as schematically indicated in FIG. 2. Each distributed unit 311, 312 comprises a transceiver unit 1311A, 1312A for transmission and reception of communications between the respective distributed units 311, 312 and their associated controlling node 321, 322 and also for transmission and reception of wireless radio communications between the respective distributed units 311, 312 and any terminal device they are currently supporting. Each distributed unit 311, 312 further comprises a processor unit 1311B, 1312B configured to control the operation of the distributed unit 311, 312 in accordance with the principles described herein. The respective processor units 1311B, 1312B of the distributed units may again comprise various sub-units. These sub-units may be implemented as discrete hardware elements or as appropriately configured functions of the processor unit. Thus, the respective processor units 1311B, 1312B may comprise a processor unit which is suitably configured/programmed to provide the desired functionality described herein using conventional programming/configuration techniques for equipment in wireless telecommunications systems. The respective transceiver units 1311A, 1312A and processor units 1311B, 1312B are schematically shown in FIG. 2 as separate elements for ease of representation. However, it will be appreciated the functionality of these units can be provided in various different ways, for example using a single suitably programmed general purpose computer, or suitably configured application-specific integrated circuit(s)/circuitry. It will be appreciated the distributed units 311, 312 will in general comprise various other elements, for example a power supply, associated with their operating functionality.

As discussed above, mobile communications networks such as network 100 or network 300 may be used to carry transmissions for services with a variety of constraints, such as traffic which are high capacity and have some tolerance to delay and traffic which is low capacity but with a low tolerance to delay. While the principles of the disclosure will be illustrated in the context of a mobile network where a network element (e.g. TRP, eNB, BTS, . . . ) transmits eMBB and URLLC data to a mobile unit, it will appreciated that the same principles apply to 3G networks, LTE networks or any other suitable network and to any appropriate type or types of data. Likewise, the same principles and teachings can also be used for uplink transmissions from a mobile device to a network receiver (e.g. BTS, eNB, TRP, etc.).

Figure 3:
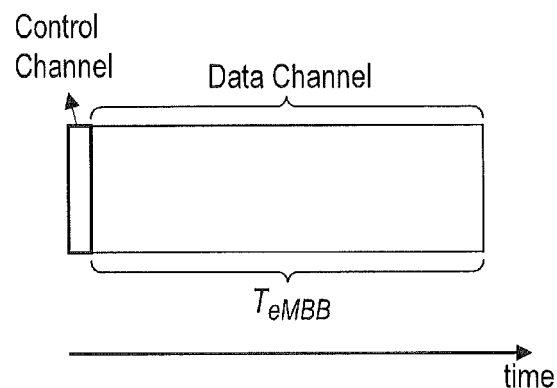
FIG. 3 schematically represents an example eMBB transmission in accordance with the present disclosure.
Figure 4:
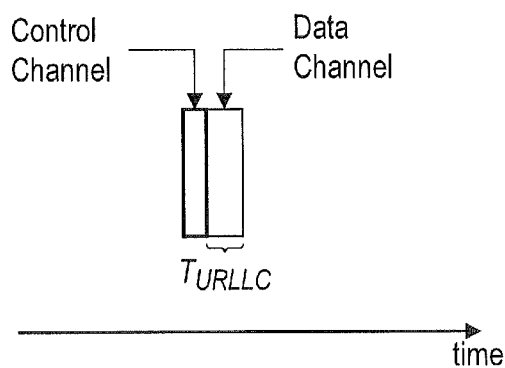
FIG. 4 schematically represents an example URLLC transmission in accordance with the present disclosure.

Returning to the example of eMBB and URLLC traffic, examples of suitable subframe structure for sending eMBB data and URLLC data are illustrated in FIGS. 3 and 4 respectively. It is noteworthy that while the present disclosure is generally provided referring to subframes, the same teachings apply in respect of frames or of any other suitable time unit. An example eMBB subframe structure is shown in FIG. 3 with transmission period $T_{eMBB}$ (e.g. 0.5 ms, 1 ms, 5 ms, 10 ms or 50 ms), where the control channel uses significantly smaller transmission resources than that of the data channel. In this manner, the overhead caused by control transmissions is reduced. On the other hand, if new URLLC data to be sent is identified or received for transmission once the transmission of an eMBB subframe has already started, it would have to be sent in a future subframe which may lead to a delay in transmitting this data. Namely, the delay would be of at least the remaining transmission time for the current eMBB subframe which may create a delay that is not acceptable for the URLLC transmission. Presented differently, as a trade-off for the lower overhead, the transmission delay for longer subframes is increased compared to the transmission delay for shorter subframes. This example eMBB subframe is thus well adapted to the transmission of relatively high capacity and high delay tolerance traffic (e.g. streaming of video, web traffic, etc.).

Now turning to FIG. 4, an example of a URLLC subframe structure is illustrated with a transmission period of $T_{URLLC}$ (e.g. 0.25 ms), where the control and data channels occupy a short duration of time compared to the subframe illustrated in FIG. 3. The transmission length of URLLC data $T_{URLLC}$ is expected to be much smaller than that of eMBB $T_{eMBB}$, that is, $T_{eMBB} \gg T_{URLLC}$. An example requirement currently considered for URLLC is a low latency transmission measured from the ingress of a layer 2 packet to its egress from the network, with a proposed target of 1 ms. With such a subframe structure and compared to that of FIG. 3, the overhead created by the transmission of control information is greater but if new data is received during the transmission of a current subframe, a new subframe can be sent quicker (as the transmission of the current subframe will finish earlier than for a longer subframe) and thus the delay for sending data is relatively smaller. As the skilled person will appreciate, this type of subframe is better adapted for sending low capacity traffic that is sensitive to delay (e.g. emergency and safety systems, health monitoring, real-time interactive data etc.), in accordance with the expected low delay requirements for URLLC traffic, than for sending high capacity and high delay tolerant traffic.

In a mobile network, it is generally expected that the different services can be multiplexed in the same system bandwidth. That would mean that eMBB and URLLC traffic would be scheduled by the network in the same (time and/or frequency) resources and that each mobile unit receiving the transmissions should be able to find the relevant types of transmissions addressed to it. Possible options for multiplexing these different types of traffic and subframes include:

Orthogonal time resources multiplexing. Here the base station uses a scheduling interval that is short enough to meet URLLC latency requirements for both the eMBB and URLLC to allow URLLC and eMBB to be scheduled on orthogonal transmission resources. One disadvantage of this approach is that it creates a relatively large amount of scheduling-related overhead for the eMBB thereby significantly reducing its spectral efficiency. Another option would be to reserve some time periods for URLLC transmissions. One disadvantage would be that the amount of reserved resources would have to be overestimated to try to ensure that resources are always available for URLLC transmissions (with a view to meeting the delay targets) which is likely to result in a sub-optimal use of available resources and thus a loss of capacity for the network (which in turn would translate into a loss of capacity for eMBB traffic as well).

Orthogonal frequency resources, where eMBB and URLLC use different frequency resources. One drawback is that, as when reserving time resources for URLLC (see above), this is likely to result in a reduced overall capacity for the network. Also, in some systems, such as NR or 5G systems, orthogonal frequency resources may not be available because the network can sometimes be expected to serve many users and to occupy a large portion of resources for eMBB transmissions for a relatively long time.

Figure 5:
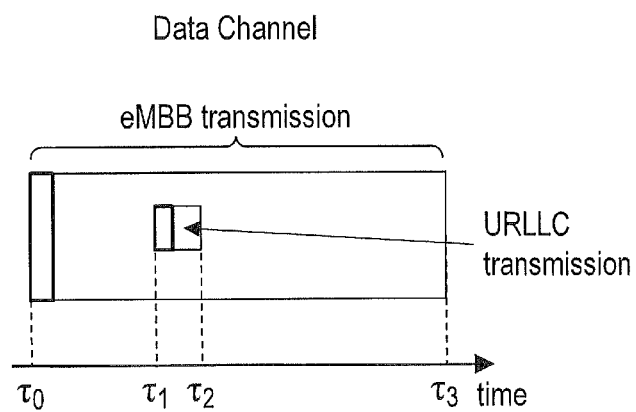
FIG. 5 schematically represents an example multiplexing of eMBB and URLLC transmissions.

With a view to providing multiplexing of URLLC and eMBB transmissions in a manner that aims at providing a low latency URLLC transmission, another option is to occupy a subset of the resources already allocated to eMBB for sending URLLC data. This is illustrated with reference to FIG. 5, where an eMBB transmission started at time τ0, and is expected to occupy all available transmission resources until time τ3. At time (or shortly before) τ1, a URLLC packet arrives and it needs to be transmitted immediately. If there are no other available transmission resources, it can then occupy a portion of the eMBB resources as shown in FIG. 5 until time τ2. Different methods for multiplexing the two types of transmissions using resources originally allocated for one of the transmissions only include:

Superposing: The base station schedules the eMBB in the most efficient way, for example with long scheduling intervals as discussed with respect to FIG. 3. Then when a URLLC transport block arrives, this is superposed (for example by use of multi-user superposition "MUST" which is discussed in document [4]) on the eMBB transmission. This means that the eMBB transmission would then suffer from some multi-user superposition interference on those resource elements shared with the URLLC transport blocks. This can result potentially in both the eMBB and the URLLC transmissions being corrupted.

Puncturing: The eNodeB schedules the eMBB in the most efficient way, for example with long scheduling intervals as above. Then the eNodeB punctures the eMBB transmission to create space to fit the arriving URLLC transport block. This means that some of the transmission resources previously designated for use by the eMBB transport blocks are allowed to be used for transmitting URLLC transport blocks instead. The eMBB samples that were designated to be transmitted on the punctured transmission resources are not transmitted at all and are effectively removed from the transmission.

Superposing or puncturing an eMBB transmission as discussed above would affect the likelihood of the eMBB transmission being safely received or recovered and this may lead to a failed transmission. Some possible methods to ensure recovery of the eMBB transport block (TB) include:

Use of an existing HARQ retransmission scheme (or similar) which allows the data of the eMBB packet to be retransmitted when the data was too corrupted to be recovered. However unlike other transmissions (e.g. legacy LTE packet transmission), eMBB transmissions can be resource intensive and the retransmission would occupy a large portion of the available resources. This would result in a large number of resources being required for retransmitting the corrupted data (which may be much larger than the resources used for the URLLC transmission).

Use outer layer coding, where additional coding is performed on multiple eMBB packets. However this would increase the latency in receiving the eMBB packets since the UE needs to receive several eMBB packets and the outer layer coding parity bits in order to perform the outer layer decoding process and since the eMBB subframes for sending eMBB packets are expected to be relatively long.

It will thus be appreciated that in these cases, the collision between the eMBB data and the URLLC data is such that this may not be satisfactorily addressed and that the eMBB transmission may not be easily recovered without causing further problems.

It can therefore be desirable to use transmission techniques for the first (e.g. eMBB) transmission with a view to reducing the impact of the later second (URLLC) transmission. In particular, while a terminal may be able to repair the affected eMBB transmission using retransmission procedures, if this terminal were able to decode the eMBB transmission despite the collision and without any retransmission, this would of course provide for a more efficient use of the mobile network's resources and reduce the latency of the eMBB transmissions.

In accordance with the present disclosure, a first (e.g. eMBB) transmission that may be affected by a second urgent (e.g. URLLC) transmission may be transmitted using signal space diversity configured so as to increase the likelihood of the terminal being able to decode the first transmission even if it is affected by an originally unplanned second transmission.

Figure 6:
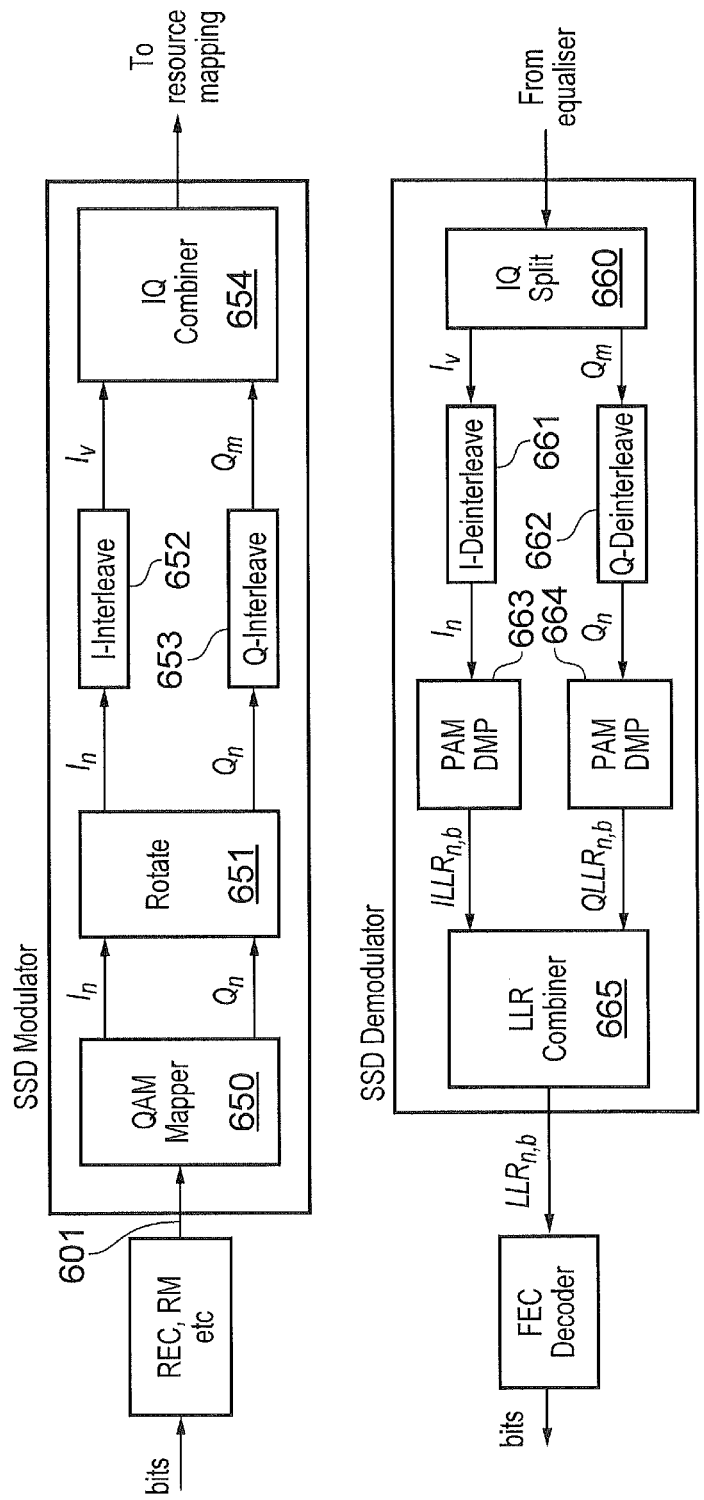
FIG. 6 schematically represents the operation of an SSD transmitter and SSD receiver FIG. 7 schematically represents the effect of the rotation of a modulation symbol.
Figure 7:
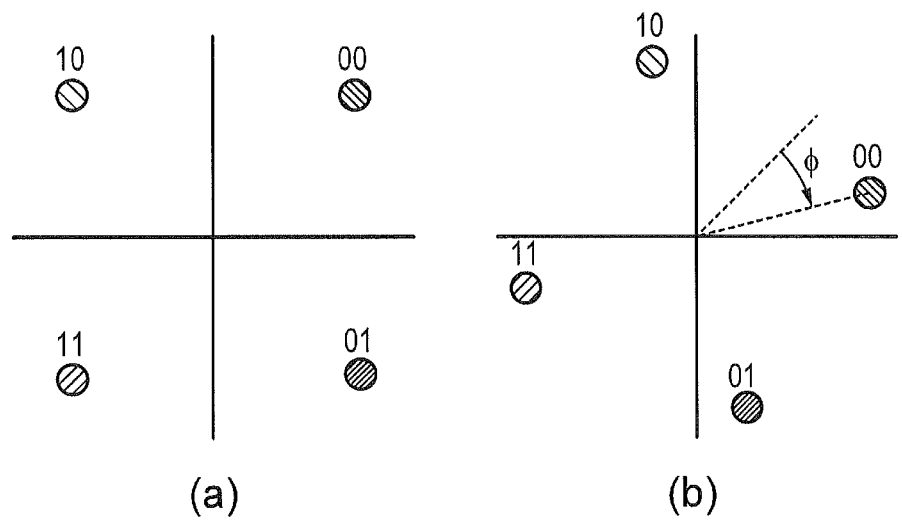
Figure 8:
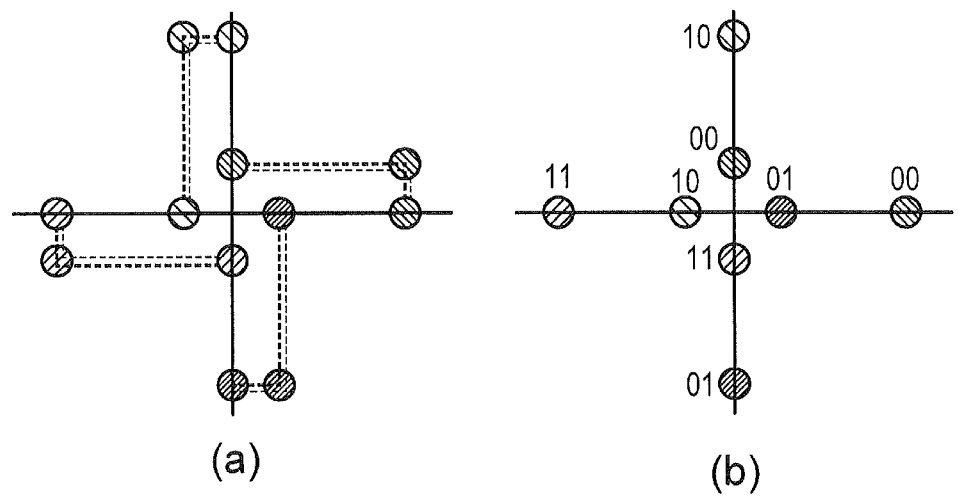
FIG. 8 schematically represents the projections of a rotated modulation symbol.

First, for the sake of completeness, an example operation mode of signal space diversity will be described with reference to FIGS. 6 to 8. The skilled person is also directed to document "Signal Space Diversity: a power and bandwidth efficient diversity technique for the Rayleigh fading channel" [3] which may be of interest for understanding how Signal Space Diversity (SSD) techniques can be used. FIG. 6 illustrates an example of an SSD modulator at the transmitter and of a corresponding SSD demodulator at the received.

A data flow 601 is received at a Quadrature Amplitude Modulation (QAM) mapper 650 which generates I (In-phase) and Q (quadrature) signals taking values $I_n$ and $Q_n$. The data flow may for example be received from a FEC encoding and rate matching process. In effect the Transport Blocks (TB) bits are mapped to modulation symbols using a QAM constellation such as the one illustrated in FIG. 7(a) in a case where a QPSK modulation is used. Then, each real and imaginary component of the complex signal $S_n=I_n+jQ_n$ from the QAM mapper is rotated by the same angle Ø as illustrated by the "rotate" stage 651 in FIG. 7(b). An appropriate angle Ø is generally selected for each QAM size. As a result, the rotated complex signal $S^r$ is represented as $S_n^r=S_n e^{-j\varnothing}$. As can be seen in FIGS. 7(a) and (b), the rotation converts the constellation point into such that in general $I_n^r \neq Q_n^r$. This means that each rotated constellation point $S_n^r$ can produce a unique projection on the I and Q axes. This is different from the points of the original non-rotated constellation whose projections on the real and imaginary axes would coincide with the projections of other points. This is illustrated in FIG. 8 which shows the projection of the different constellation points after rotation by the angle Ø. For example, whilst in the original un-rotated constellation of FIG. 7(a) the projections of the point (1+j1) with label "00" and of the point (1−j1) with label "01" on the I-axis would coincide at (1+j0), the rotation allows the two points labeled "00" and "01" to project to distinguished points on the I axis. The same applies for example for the points labelled "00" and "10" in the case of projection to the Q-axis, as can also be seen in FIGS. 8(a) and (b). In other words, for any QAM constellation, a careful selection of the rotation angle Ø can lead to distinct real components and to distinct imaginary components for each data point in the constellation. As a result, if a receiver is only able to receive one of the components (e.g. I or Q) of the signal S, the transmitted point $S_n$ may still be decoded accurately. Decoding can be performed with various types of de-mapper. FIG. 6 shows a decoder using a pair of pulse amplitude modulation (PAM) de-mappers 663, 664 (one de-mapper for the I-component and one de-mapper for the Q-component). It will be appreciated that decoders can be based on other architectures, including maximum likelihood decoding or joint detection of the I and Q components. For the PAM de-mapper, if both components are received, the outputs from the two PAM de-mappers can be combined to provide (signal space) diversity and a more robust transmission decoding. Maximum likelihood or joint detection decoders inherently perform combination of the I and Q components, providing signal space diversity. In some examples, the receiver can be configured such that, if it is known by the receiver that one or other of the components was not received or its reception was highly unreliable, then the receiver can ignore the unreliable component and decode all the bits modulated on the original QAM symbol from only the reliably received component in a kind of switched diversity.

While the discussion above and below has been presented in the context of a "QAM" modulation, the skilled person will appreciate that the same principles can apply to any suitable type of modulation. In general, with the rotation and for a $M^2$ order constellation, $M^2$ distinct components can be obtained from projecting to each axes. Without rotation, projection to each axis will produce only M components. The QAM modulation discussed above is an example where M=2 and where $M^2=4$ different components can be projected to one axis whereas only M=2 different components would be possible on the same axes without rotation. Modulations that can be used with rotation and/or SSD include for example QPSK where M=2, 16QAM where M=4, etc.

Once the constellation points have been rotated to generate $S^r$, the sequence of $I^r$ and $Q^r$ components of the rotated constellation points are then interleaved separately by I-interleaver 652 and Q-interleaver 653, prior to being combined by combiner 654. The effect of the component interleavers is to shuffle the respective ordering of components differently with a view to ensuring that although $I_n^r$ and $Q_n^r$ enter their respective component interleavers at the same time, they exit at different times. The result is that when the outputs of the component interleavers are combined, the n-th output of the SSD modulator is $S_n^r=I_v^r+jQ_m^r$ where v≠m. The overall effect is that the I and Q components of the original constellation point from the QAM mapper have been separated and will be transmitted using different resource elements. Conventionally, the interleavers are used to try to reduce the effect of fading with a view to having the I and Q components being affected differently by fading. The I and Q components are then recombined in the IQ combiner block 654 to be mapped onto resource elements for transmission. A corresponding reverse signal processing chain is provided at the receiver for the receiver to attempt to retrieve the original signal S from the received combined, interleaved, rotated and modulated signal that is received via the resource elements. The operation of these reverse elements will not be discussed herein, in the interest of conciseness, as the skilled person would have no difficulty understanding what corresponding reverse stages are to be provided for the SSD demodulator to correspond to the SSD modulator discussed above.

According to the present disclosure, the interleaver(s) of the SSD modulator (and the corresponding de-interleaver(s) 661, 662 of the SSD demodulator) is(are) configured such that the corresponding real and imaginary components ($I_n$ and $Q_n$ respectively) of a rotated signal $S_n$ are separated widely enough with a view to avoid both components being transmitted during the time-frequency resources that are used for an urgent (colliding) URLLC transmission. Accordingly, only one of the components $I_n$ and $Q_n$ would be affected by the URLLC insertion and the other one would not be affected by this transmission. In other words, regardless of the URLLC transmission puncturing or interfering with the eMBB originally scheduled in the resources used by the URLLC transmission, at least one of the $I_n$ or $Q_n$ components of the modulated QAM symbol would be received by the UE.

Therefore, when the eMBB transmission is affected by a collision, both the I and the Q components of the IQ-combined transmitted signal will affected by the collision but the I-component and Q-component of the affected IQ-combined signal each belong to different modulation symbols of the signal S. Hence, it is expected that only one of the I-component or Q-component of the same modulation symbol will be affected by the collision. For the case where the I-component of S is known to be affected by a collision, the PAM de-mapper of the SSD demodulator shown in FIG. 6 can produce a low certainty demodulation of the data bits from the I-component whilst the other PAM de-mapper can produce a high certainty demodulation of the data bits from the Q component. On the other hand, for the portion where the Q component of the signal was affected, the PAM de-mapper of the SSD demodulator for the Q component can produce a low certainty demodulation of the data bits whilst the other PAM de-mapper can produce a high certainty demodulation of the data bits. When the results are combined, the high certainty of the unaffected PAM is expected to render the effect of the URLLC on the eMBB transmission less noticeable that in a case where SSD is not used or where SSD is used but with a different type of interleaving. In an example, instead of demodulating I-components or Q-components with a low certainty demodulation, LLR values for the unreliable respective I-component or Q-component are replaced with zeroes (in which case the LLR combiner 665 of FIG. 6 acts as a switch between LLRs from the I-component or LLRs from the Q-component when processing a modulation symbol where one of the I- or Q-component has been affected).

Figures 9, 10, 11:
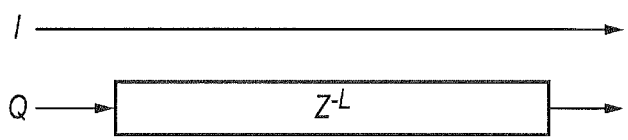
FIG. 9 schematically represents an example operation of an interleaver in accordance with the present disclosure.
FIG. 10 schematically represents the effect of a collision on the I and Q components of a signal in accordance with an arrangement of the present disclosure.
FIG. 11 schematically represents an interleaver in accordance with the present disclosure.

FIGS. 9 and 10 briefly illustrate the principles discussed above with a simplified example across a single frequency band. In this example, a transmission using 25 resource elements is affected by a collision with a 6-RE URLLC transmission. In this case, as it is expected that the transmission could be corrupted by one or more URLLC transmissions and assuming that URLLC transmissions are not expected to use more than 6 RE in the time dimension, the interleaver is configured to always interleave the transmissions (as it cannot always be known whether an eMBB transmission will be corrupted by a URLLC transmission) and to ensure a gap of at least 6 resource elements between two corresponding $I_n$ and $Q_n$ components of signal $S_n$. In this basic implementation, the Q signal is simply cyclic-shifted by 6 resource elements thereby ensuring that the required gap is maintained. As illustrated in FIG. 9, both the I and Q components are affected by the URLLC transmissions however the affected I-components do not come from the same original QAM symbol as the affected Q-components. This can be seen in FIG. 10 where the I and Q components have been reordered in the correct order 1 . . . 25. Therefore, for $I_{11}$ . . . $I_{16}$ affected by the URLLC collision, the Q-component may be used instead and for $Q_{17}$ . . . $Q_{22}$ affected by the URLLC collision, the I-component may be used instead. As mentioned above, owing to the use of SSD, the signal S may be recovered from one of the I and Q components only. While the reliability of the recovery of signal S would be reduced when using only one of the two components of the complex signal, the signal S may still be recovered (whereas it cannot be recovered at all without SSD and the signal rotation discussed above). For all of the other portions of the signal S ($I/Q_1$ . . . $I/Q_{10}$ and $I/Q_{23}$ . . . $I/Q_{35}$), both the I and Q components may be used to attempt to recover the signal S in the SSD demodulator. While in this example the resource elements have been numbered from 1 to 25, the skilled person will understand that they can equally be referred to as resource elements from 0 to 24. This simplified example has also described operation of an interleaver according to the present disclosure with the interleaver operating in the time domain, but as the skilled person will readily understand, the URLLC transmission can occupy a group of resource elements in the time and in the frequency domain and an interleaver in accordance with the present disclosure can operate in the frequency domain—as will be clear from the remainder of the present disclosure.

More generally, in accordance with the present disclosure there is provided an arrangement where the component interleavers are designed for a first transmission (e.g. eMBB transmission) with a view to significantly increasing the likelihood that any other transmission (e.g. URLLC) co-scheduled with the first transmission will impact only one of the I and Q components of any QAM symbol for the first transmission.

In a first example, the eMBB transmissions always uses SSD whenever the eNodeB expects that one or more URLLC transmissions may be allowed to coincide with the eMBB transmissions on the same transmission resources. Accordingly, a possible implementation for component interleavers for this example is illustrated in FIG. 11.

In this example, the I-component interleaver is a pass-through, that is the interleaver does not actually affect the I component and the input $I_n$ is identical to the output $I_n$. On the other hand, the Q-component interleaver is a first-in-first-out (FIFO) buffer of dimension L. Assuming the eMBB block to be transmitted is comprised of $N_{TE}$ QAM symbols, then at the start of the eMBB block, before $Q_0$ . . . $Q_{N_{TR}-L}$ enters the FIFO, the interleaver FIFO $b_i$, i=0, 1, . . . , L−1 is initialized with the values $b_{L-1-n}=Q_{N_{TR}-1}n$; n=0, 1, 2, 3, . . . L−1. The value of L can be selected to be the product $L=(N_{sym}^{TB} * N_{RR}^{sym})$ of the maximum number of OFDM symbols $N_{sym}^{TB}$ spanned by the URLLC transport block and the maximum number of resource elements per OFDM symbol $N_{RR}^{sym}$. This choice of value of L enables quadrature components from the same eMBB QAM symbol to not be both scheduled to coincide with a potential URLLC transmission.

With this example implementation, the eMBB terminal can be configured to receive SSD signals instead of conventional QAM signals so that it can always be prepared for any urgent URLCC transmission causing a collision.

In one example, the teachings provided in co-pending application EP16189083.5 (the entire content of which is incorporated herein by reference) can also be used herein. For example, a second control channel can be provided wherein it can be used to inform the terminal of the exact location of the URLLC transmission. From this, the terminal can derive how to configure the LLR combiner of FIG. 6 to operate as a switch combiner, for example to discard or disregard the log-likelihood ratios (LLRs) from the QAM components that were affected by the URLLC transmission and to then only consider the LLRs from the QAM components that were scheduled away from the URLLC transmission. However, as the skilled person will appreciate, the use of such a second a control channel is not required as such. For example, even without it, the terminal can attempt to decode the SSD as normal using maximal ratio combining for all the eMBB symbols.

In one example, the value of L used for configuring the interleaver can be provided by higher layers. In another example, the size of the interleaver L is indicated in the Downlink Control Information (DCI) received by the terminal. This can for example allow the eNodeB to have some flexibility in determining the maximum size (in OFDM symbols or REs) of the URLLC transmission that may collide with the eMBB transmission and potentially to advertise this size to the terminals that may be affected by collisions.

In yet another example, the entire eMBB transmission can be subjected to SSD and a number of different Q-component interleavers can be configured, with one Q interleaver per OFDM subcarrier. In a case where the Q-component interleavers are all of dimension $L=2N_{sym}^{TB}$, the number of such Q-component interleavers is therefore the same as the number of resource elements per OFDM symbol $N_{RR}^{sym}$. In this example, it is assumed that a URLLC transmission is expected to be transmitted and contained within a mini-slot of size $N_{sym}^{TB}$, wherein "mini-slot" refers to the expected size or maximum size of the interfering transmission, URLLC in this case. In other words, each URLLC transmission would be contrained within such a "mini-slot". Possible methods of initialising each interleaver are discussed below:

Each interleaver can be initialized at the beginning of the eMBB transmission with the Q-component values of the QAM symbols to be scheduled on the said subcarrier for the next $2N_{sym}^{TB}$ OFDM symbols in reverse order. i.e. the outputs for the I-component interleaver and Q-component interleaver are:

I-component interleaver: $I_0, I_1, I_2, I_3, \ldots, I_{NsymTB-1}, I_{NsymTB}, \ldots, I_{2NsymTB-2}, I_{2NsymTB-1}$ Q-component interleaver: $Q_{2NsymTB-1}, Q_{2NsymTB-2}, \ldots Q_{NsymTB}, Q_{NsymTB-1} \ldots Q_3, Q_2, Q_1, Q_0$ Each interleaver can be initialized at the beginning of the eMBB transmission with the Q-component values of the QAM symbols to be scheduled on the said subcarrier for the next $2N_{sym}^{TB}$ OFDM symbols in the order that the first $N_{sym}^{TB}$ Q-component values in the interleaver correspond to the second $N_{sym}^{TB}$ I-component values and the second $N_{sym}^{TB}$ Q-component values in the interleaver correspond to the first $N_{sym}^{TB}$ I-component values. In other words, the Q values would be shifted by $N_{sym}^{TB}$ REs and looping back as in a circular list. In other words, using the same example as above, the outputs for the I-component interleaver and Q-component interleaver are:

I-component interleaver: $I_0, I_1, I_2, I_3, \ldots, I_{NsymTB-1}, I_{NsymTB}, \ldots, I_{2NsymTB-2}, I_{2NsymTB-1}$ Q-component interleaver: $Q_{NsymTB}, Q_{NsymTB+1}, \ldots Q_{2NsymTB-1}, Q_0, Q_1, Q_2, \ldots Q_{NsymTB-1}$ Each interleaver can be initialized at the beginning of the eMBB transmission with the I-component values inserted in a "pass-through" fashion and the Q-Interleaver component values being delayed by $N_{sym}^{TB}$ Q-component values, or by more than $N_{sym}^{TB}$ Q-component values, where the interleavers operate in the fashion of circular-buffers. Hence the interleaver outputs are:

I-component interleaver: $I_0, I_1, I_2, I_3, \ldots, I_{NsymTB-1}, I_{NsymTB}, \ldots, I_{2NsymTB-2}, I_{2NsymTB-1} \ldots$ Q-component interleaver: $Q_{NsymTB}, Q_{NsymTB+1}, \ldots Q_{2NsymTB-1}, Q_{2NsymTB}, Q_{2NsymTB+1}, \ldots Q_{2NsymTB+1}, \ldots$ Accordingly, the I-component value and Q-component value for a modulation symbol do not both fall in the same mini-slot (of size $N_{sym}^{TB}$) which can in turn reduce the likelihood of a collision with another transmission affecting the decoding/recovery of the original (e.g. eMBB) transmission.

In the case when URLLC is scheduled in adjacent mini-slots and the eNodeB also attempts to avoid using the same frequency resources for a URLLC transmission in adjacent mini-slots, this can assist with trying to ensure that the quadrature component values of a QAM symbol originally scheduled in a particular mini-slot is not affected by a collision in the adjacent mini-slot (e.g. the I value in a first mini slot and a Qvalue in a second mini slot).

Accordingly, the eNodeB could implement a scheduling of resources that is adapted to work with the interleaving of the I and Q signals to reduce the effect of the URLLC transmission on both the I and Q values of the signal for the eMBB transmission In another example, e.g. when the number of resource elements used by the URLLC is substantially smaller than the number of resource elements per OFDM symbol, the eMBB transmission is transmitted with SSD only during the OFDM symbols in which the URLLC is being transmitted. In this embodiment, the component interleavers are similar in shape to those of FIG. 11. In this case $L=(N_{sym}^{TB}*N_{RE}^{TB})$ namely, the product of the number of OFDM symbols spanned by the URLLC transmission block and the number of resource elements per OFDM symbol used by the URLLC transmission block. When a URLLC transport mini-slot is scheduled, the eNodeB knows both $N_{sym}^{TB}$ and $N_{RE}^{TB}$ and so can dimension the interleaver (e.g. FIFO buffer) accordingly. In this case the SSD can be used for the eMBB transmission only when the eNdoeB sends the URLLC transmission while allowing the eMBB transmission to be corrupted (and repaired by SSD; the use of SDD can be limited to when it is considered most helpful, thereby saving processing resources (that would otherwise be used to implement the SSD even when it would not provide any additional benefit).

Assuming, for the ease of illustration, that the eMBB QAM symbols to be transmitted during each OFDM symbol affected by the URLLC have Q-components $Q_k$:k=0, ..., $N_{RR}^{TB}-1$, with L defined as in the previous paragraph, a FIFO buffer can be initialized with the values $b_{L-1-n}=Q_{N_{RB}^{sym}-1}\_n$:n=0, 1, 2, 3, . . . L−1 at the onset of each OFDM symbol affected by the URLLC transmission. In this example, the terminal would have to be configured to receive SSD instead of normal QAM only during the OFDM symbols affected by the URLLC transmission. With a view to providing this information to the terminal, a second signaling channel can be used, as described in the co-pending application EP16189083.5 filed 15 Sep. 2016 or any other suitable means may be used.

As the skilled person will appreciate, the teachings of the present disclosure are not limited to eMBB and URLLC transmissions (although they can be well suited to these transmissions) and they can be used for any other suitable types of transmissions which are affected by a collision. Further examples of situations where this could be useful include for example:

Control channels (such as PDCCH, PHICH etc.). In LTE, these control channels occupy separate resources to the resources used for data traffic and the data traffic is rate matched around the control channels. However the teachings of the present disclosure could be applied in a system where SSD is applied to the data traffic and the control channels can puncture the data traffic. In this case, the use of the present disclosure can improve performances by trying to ensure that the puncturing does not affect both the I-component and Q-component of the same modulation symbol (e.g. by interleaving the I-components and Q-components to different sets of resource elements)

Reference signals, such as cell-specific reference signals (CRS). In LTE, the data traffic is rate matched around the CRS. Using the present disclosure can potentially allow CRS to puncture the data traffic without significant loss in performance. A possible benefit of using such an arrangement could be a simplification of the rate matching of the data traffic to the physical resource (it can for example always be rate matched to the same basic unit of physical resource: a rectangle of subcarriers and OFDM symbols; there would then be no need for a flexible rate matching algorithm that can handle any amount of physical resources, thereby providing a simplified UE design)

A simple interleaver that can be applied in this case is a 2 resource element interleaver. Since reference signals do not exist in adjacent subcarriers, such a 2 resource element interleaver can be used. The interleaver can for example work by combining $I_{2n}$ with $Q_{2n+1}$, mapping this combined symbol to subcarrier 2n and by combining $I_{2n+1}$ with $Q_{2n}$ and mapping this combined symbol to subcarrier 2n+1.

An feMTC transmission can be collided with a narrowband NB-IoT transmission. If SSD with an appropriate interleaving stage is applied to the feMTC transmission, the corruption or puncturing by the NB-IoT transmission can be rendered more benign due to the SSD properties previously discussed. If the NB-IoT transmission has a bandwidth of up to 180 kHz (or 12 subcarriers for a 15 kHz subcarrier spacing), a suitable interleaver for feMTC SSD transmissions could for example span 24 subcarriers or more.

In a sub-example, since it is expected that there would only be a limited number of potential locations for an NB-IoT carrier, SSD feMTC transmissions can only span twice the number of subcarriers of the NB-IoT bandwidth. Other subcarriers may be modulated in a non-SSD mode. For example, if the feMTC transmission is 24 PRBs wide (288 subcarriers), 24 of those subcarriers that span a potential NB-IoT carrier can be SSD modulated and the other 288−24=264 subcarriers can be modulated with a non-SSD transmission.

While the discussions above have generally been presented in the context of transmissions to one terminal being punctured however, as the skilled person will appreciate, the same principles apply if the transmissions to two or more terminals are being punctured. For example, the URLLC transmission may use some resources originally allocated for a data transmission to a first terminal or group of terminals as well as other resources originally allocated for a data transmission to a second terminal or group of terminals. In effect, it is not relevant to the recipient(s) of a punctured transmission that other transmissions might have been punctured as well, what is relevant to the recipient is which of its resources have been used to send other data instead of its data or superimposed with its data. The principles herein can thus be applied equally to puncturing/superposition of transmissions to different recipients.

As the skilled person will appreciate, the terms terminal, UE, mobile device, mobile terminal, etc. can be used interchangeably and are not intended to be limiting. Likewise, the term base station has generally been used and is intended to include at least BTS, eNB, TRP, eNodeB etc.

While the invention has generally been discussed in the context of downlink transmissions, it will be appreciated that the same principles may be used for uplink transmissions.

Thus there has been described a method of transmitting a wireless signal corresponding to a data input, the method comprising: generating, from the data input, a quadrature signal comprising a real component "I" signal and an imaginary component "Q" signal, the I and Q signals providing $I_n$ and $Q_n$ values for each transmission unit n of a plurality of transmission units; rotating the quadrature signal by an angle to provide signal space diversity thereby generating rotated I and Q signals; and interleaving the rotated I and Q signals to leave a gap of at least L transmission units between corresponding $I_n$ and $Q_n$ values for each of the transmission units n of the plurality of transmission units, wherein L is selected to be equal to or greater than an expected maximum size, measured in transmission units, of a possible colliding wireless signal, thereby generating interleaved I and Q signals.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely illustrative embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

In the present disclosure, method steps discussed herein may be carried out in any suitable order and not necessarily in the order in which they are listed. For example, steps may be carried out in an order which differs from an order used in the examples discussed above or from an indicative order used anywhere else for listing steps (e.g. in the claims), whenever possible or appropriate. Thus, in some cases, some steps may be carried out in a different order, or simultaneously (entirely or in part) or in the same order. So long as an order for carrying any of the steps of any method discussed herein is technically feasible, it is explicitly encompassed within the present disclosure.

As used herein, transmitting information or a message to an element may involve sending one or more messages to the element and may involve sending part of the information separately from the rest of the information. The number of "messages" involved may also vary depending on the layer or granularity considered. For example transmitting a message may involve using several resource elements in an LTE environment such that several signals at a lower layer correspond to a single message at a higher layer. Also, transmissions from one terminal to another may relate to the transmission of any one or more of user data, discovery information, control signalling and any other type of information to be transmitted.

Also, whenever an aspect is disclosed in respect of an apparatus or system, the teachings are also disclosed for the corresponding method. Likewise, whenever an aspect is disclosed in respect of a method, the teachings are also disclosed for any suitable corresponding apparatus or system. Additionally, it is also hereby explicitly disclosed that for any teachings relating to a method or a system where it has not been clearly specified which element or elements are configured to carry out a function or a step, any suitable element or elements that can carry out the function can be configured to carry out this function or step. For example any one or more of a mobile terminal, a base station or any other mobile unit may be configured accordingly if appropriate, so long as it is technically feasible and not explicitly excluded.

Whenever the expressions "greater than" or "smaller than" or equivalent are used herein, it is intended that they discloses both alternatives "and equal to" and "and not equal to" unless one alternative is expressly excluded or is not technically relevant.

It is noteworthy that even though the present disclosure has been discussed in the context of LTE and/or 5G, its teachings are applicable to but not limited to LTE, 5G or to other 3GPP standards. In particular, even though the terminology used herein is generally the same or similar to that of the 5G standards, the teachings are not limited to the present version of 5G and could apply equally to any appropriate arrangement not based on 5G and/or compliant with any other future version of an 5G or 3GPP or other standard.

Respective features of the present disclosure are defined by the following numbered paragraphs:

Example 1

A method of transmitting a wireless signal corresponding to a data input, the method comprising:
generating, from the data input, a quadrature signal comprising a real component "I" signal and an imaginary component "Q" signal, the I and Q signals providing In and Qn values for each transmission unit n of a plurality of transmission units;
rotating the quadrature signal by an angle to provide signal space diversity thereby generating rotated I and Q signals; and
interleaving the rotated I and Q signals to leave a gap of at least L transmission units between corresponding In and Qn values for each of the transmission units n of the plurality of transmission units, wherein L is selected to be equal to or greater than an expected maximum size, measured in transmission units, of a possible colliding wireless signal, thereby generating interleaved I and Q signals.

Example 2

The method of Example 1 further comprising:
recombining the interleaved I and Q signals into a combined signal; and
mapping the combined signal onto the plurality of transmission units for transmission via a wireless interface.

Example 3

The method of any preceding Example wherein interleaving the rotated I and Q signals comprises interleaving only one of the rotated I and Q signals.

Example 4

The method of any preceding Example wherein the interleaving of the rotated I and Q signals is carried out for the I and Q signals to be transmitted in one sub-carrier and wherein L is selected to be equal to or greater than an expected maximum size of the possible colliding wireless signal in the one sub-carrier.

Example 5

The method of any preceding Example wherein interleaving the rotated I and Q signals comprises:
letting a first signal of the rotated I and Q signals go through without rearranging the first signal performing a cyclic shift of size L of the second signal of the rotated I and Q signals.

Example 6

The method of any preceding Example wherein interleaving the rotated I and Q signals comprises:
determining a maximum length N of a slot for transmitting a possible colliding signal; interleaving the rotated I and Q signals comprises re-odering the values of a first signal of the rotated I and Q signals comprises in a reverse order for a group of 2N consecutive values of the first signal and maintaining the order of the corresponding 2N values for the other signal of the rotated I and Q signals.

Example 7

The method of any preceding Example further comprising transmitting an indication of the selected L to one or more terminals.

Example 8

A method of receiving a wireless signal, the method comprising
receiving, from a wireless interface, a combined complex signal sent using a plurality of transmission units;
splitting the complex signal into a real component "I" signal and an imaginary component "Q" signal, the split I and Q signals providing In and Qn values for each transmission unit n of a plurality of transmission units;

de-interleaving the split I and Q signals to reverse an interleaving function to generate de-interleaved I and Q signals, wherein the de-interleaving is configured to re-order the split In and Qn values to attempt to recover pre-interleaving I and Q signals, wherein the interleaving function introduces a gap of at least L transmission units between corresponding pre-interleaved In and Qn values for each of the transmission units and wherein L is selected to be equal to or greater than an expected maximum size, measured in transmission units, of a possible colliding wireless signal.

Example 9

The method of Example 8 further comprising:
applying a reverse modulation and rotation function to each of the de-interleaved I and Q signals to attempt to recover a data input used for generating the combined complex signal received via the wireless interface.

Example 10

The method of Example 8 wherein applying a reverse modulation and rotation function comprises:
pulse amplitude modulation "PAM" de-mapping each of the de-interleaved I and Q signals to attempt to recover original bits in modulated symbols used for generating the signal received as the combined complex signal, thereby generating log-likelihood ratios of the original bits for each of the de-interleaved I and Q signals; and
combining the log-likelihood ratios for each of the de-interleaved I and Q signals into a combined log likelihood ratio combiner to attempt to recover the data input.

Example 11

The method of any of Examples 8 to 10 further comprising:
receiving an indication of a plurality of transmission units where the combined complex signal was affected by a colliding wireless signal;
wherein applying a reverse modulation and rotation function comprises:
for each value of the de-interleaved I and Q signals that was transmitted in one of the plurality of transmission units, applying a reverse modulation and rotation function where the each value is associated with a low certainty or is replaced with a zero value;

Example 12

The method of any of Examples 8 to 11 further comprising:
receiving the parameter L from a network element;
de-interleaving the split I and Q signals based on the received L parameter.

Example 13

The method of any preceding Example wherein a transmission unit is a resource element.

Example 14

A base station for transmitting, in a telecommunications network, a wireless signal corresponding to a data input, the base station being configured to:

generate, from the data input, a quadrature signal comprising a real component "I" signal and an imaginary component "Q" signal, the I and Q signals providing In and Qn values for each transmission unit n of a plurality of transmission units;
rotate the quadrature signal by an angle to provide signal space diversity thereby generating rotated I and Q signals; and
interleave the rotated I and Q signals to leave a gap of at least L transmission units between corresponding In and Qn values for each of the transmission units n of the plurality of transmission units, wherein L is selected to be equal to or greater than an expected maximum size, measured in transmission units, of a possible colliding wireless signal, thereby generating interleaved I and Q signals.

Example 15

The base station of Example 14 being further configured to:
recombining the interleaved I and Q signals into a combined signal; and
mapping the combined signal onto the plurality of transmission units for transmission via a wireless interface.

Example 16

The base station of any of Examples 14 to 15 wherein interleaving the rotated I and Q signals comprises interleaving only one of the rotated I and Q signals.

Example 17

The base station of any of Examples 14 to 16 wherein the interleaving of the rotated I and Q signals is carried out for the I and Q signals to be transmitted in one sub-carrier and wherein L is selected to be equal to or greater than an expected maximum size of the possible colliding wireless signal in the one sub-carrier.

Example 18

The base station of any of Examples 14 to 17 wherein interleaving the rotated I and Q signals comprises:
letting a first signal of the rotated I and Q signals go through without rearranging the first signal performing a cyclic shift of size L of the second signal of the rotated I and Q signals.

Example 19

The base station of any of Examples 14 to 18 wherein interleaving the rotated I and Q signals comprises:
determining a maximum length N of a slot for transmitting a possible colliding signal; interleaving the rotated I and Q signals comprises re-odering the values of a first signal of the rotated I and Q signals comprises in a reverse order for a group of 2N consecutive values of the first signal and maintaining the order of the corresponding 2N values for the other signal of the rotated I and Q signals.

Example 20

The base station of any of Examples 14 to 19 further comprising transmitting an indication of the selected L to one or more terminals.

Example 21

Circuitry for a base station for use in a mobile telecommunications system and for transmitting a wireless signal corresponding to a data input, wherein the circuitry comprises a controller element and a transceiver element configured to operate together to:
generate, from the data input, a quadrature signal comprising a real component "I" signal and an imaginary component "Q" signal, the I and Q signals providing In and Qn values for each transmission unit n of a plurality of transmission units;
rotate the quadrature signal by an angle to provide signal space diversity thereby generating rotated I and Q signals; and
interleave the rotated I and Q signals to leave a gap of at least L transmission units between corresponding In and Qn values for each of the transmission units n of the plurality of transmission units, wherein L is selected to be equal to or greater than an expected maximum size, measured in transmission units, of a possible colliding wireless signal, thereby generating interleaved I and Q signals.

Example 22

A base station for transmitting, in a telecommunications network, a wireless signal corresponding to a data input, the base station being configured to implement to method of any of Examples 1 to 7.

Example 23

A terminal for receiving a wireless signal in a telecommunications network, the terminal being configured to:
receive, from a wireless interface, a combined complex signal sent using a plurality of transmission units;
split the complex signal into a real component "I" signal and an imaginary component "Q" signal, the split I and Q signals providing In and Qn values for each transmission unit n of a plurality of transmission units;
de-interleave the split I and Q signals to reverse an interleaving function to generate de-interleaved I and Q signals, wherein the de-interleaving is configured to re-order the split In and Qn values to attempt to recover pre-interleaving I and Q signals, wherein the interleaving function introduces a gap of at least L transmission units between corresponding pre-interleaved In and Qn values for each of the transmission units and wherein L is selected to be equal to or greater than an expected maximum size, measured in transmission units, of a possible colliding wireless signal.

Example 24

The terminal of Example 23 further configured to:
apply a reverse modulation and rotation function to each of the de-interleaved I and Q signals to attempt to recover a data input used for generating the combined complex signal received via the wireless interface.

Example 25

The terminal of Example 23 wherein the terminal being configured to apply a reverse modulation and rotation function comprises the terminal being configured to:
pulse amplitude modulation "PAM" de-map each of the de-interleaved I and Q signals to attempt to recover original bits in modulated symbols used for generating the signal received as the combined complex signal, thereby generating log-likelihood ratios of the original bits for each of the de-interleaved I and Q signals; and
combine the log-likelihood ratios for each of the de-interleaved I and Q signals into a combined log likelihood ratio combiner to attempt to recover the data input.

Example 26

The terminal of any of Examples 23 to 25 being further configured to:
receive an indication of a plurality of transmission units where the combined complex signal was affected by a colliding wireless signal;
wherein terminal being configured to apply a reverse modulation and rotation function comprises the terminal being configured to:
for each value of the de-interleaved I and Q signals that was transmitted in one of the plurality of transmission units, apply a reverse modulation and rotation function where the each value is associated with a low certainty or is replaced with a zero value;

Example 27

The terminal of any of Examples 23 to 26 being further configured to:
receive the parameter L from a network element;
de-interleave the split I and Q signals based on the received L parameter.

Example 28

Circuitry for a terminal for receiving a wireless signal in a mobile telecommunications system, wherein the circuitry comprises a controller element and a transceiver element configured to operate together to:
receive, from a wireless interface, a combined complex signal sent using a plurality of transmission units;
split the complex signal into a real component "I" signal and an imaginary component "Q" signal, the split I and Q signals providing In and Qn values for each transmission unit n of a plurality of transmission units;
de-interleave the split I and Q signals to reverse an interleaving function to generate de-interleaved I and Q signals, wherein the de-interleaving is configured to re-order the split In and Qn values to attempt to recover pre-interleaving I and Q signals, wherein the interleaving function introduces a gap of at least L transmission units between corresponding pre-interleaved In and Qn values for each of the transmission units and wherein L is selected to be equal to or greater than an expected maximum size, measured in transmission units, of a possible colliding wireless signal.

Example 29

A terminal for receiving a wireless signal in a telecommunications network, the terminal being configured to carry out the method of any of Examples 8 to 13.

REFERENCES

[1] RP-160671, "New SID Proposal: Study on New Radio Access Technology," NTT DOCOMO, RAN #71
[2] Holma H. and Toskala A, "LTE for UMTS OFDMA and SC-FDMA based radio access", John Wiley and Sons, 2009

[3] "Signal Space Diversity: a power and bandwidth efficient diversity technique for the Rayleigh fading channel" by J. Boutros and E. Viterbo, IEEE Transactions on Information Theory, vol. 44, n. 4, pp. 1453-1467, July 1998

[4] 3rd Generation Partnership Project; TR36.859: Technical Specification Group Radio Access Network; "Study on Downlink Multiuser Superposition Transmission (MUST) for LTE"; (Release 13), November 2015.

What is claimed is:

1. Circuitry for a base station for use in a mobile telecommunications system and for transmitting a wireless signal corresponding to a data input, wherein the circuitry is configured to:
  generate, from the data input, a quadrature signal comprising a real component "I" signal and an imaginary component "Q" signal, the I and Q signals providing In and Qn values for each transmission unit n of a plurality of transmission units;
  rotate the quadrature signal by an angle to provide signal space diversity thereby generating rotated I and Q signals; and
  interleave the rotated I and Q signals to leave a gap of at least L transmission units between corresponding In and Qn values for each of the transmission units n of the plurality of transmission units, wherein L is selected to be equal to or greater than an expected maximum size, measured in transmission units, of a possible colliding wireless signal.

2. The circuitry of claim 1, wherein the circuitry is configured to recombine the interleaved I and Q signals into a combined signal.

3. The circuitry of claim 2, wherein the circuitry is configured to map the combined signal onto the plurality of transmission units for transmission via a wireless interface.

4. The circuitry of claim 1, wherein interleaving the rotated I and Q signals comprises interleaving only one of the rotated I and Q signals.

5. The circuitry of claim 1, wherein interleaving the rotated I and Q signals is carried out for the I and Q signals to be transmitted in one sub-carrier.

6. The circuitry of claim 1, wherein L is selected to be equal to or greater than an expected maximum size of the possible colliding wireless signal in the one sub-carrier.

7. The circuitry of claim 1, wherein interleaving the rotated I and Q signals comprises letting a first signal of the rotated I and Q signals go through without rearranging the first signal performing a cyclic shift of size L of the second signal of the rotated I and Q signals.

8. The circuitry of claim 1 wherein interleaving the rotated I and Q signals comprises:
  determining a maximum length N of a slot for transmitting a possible colliding signal; and
  reordering the values of a first signal of the rotated I and Q signals in a reverse order for a group of 2N consecutive values of the first signal and maintaining the order of the corresponding 2N values for the other signal of the rotated I and Q signals.

9. The circuitry of claim 1, wherein the circuitry is configured to transmit an indication of the selected L to one or more terminals.

10. A base station for transmitting, in a telecommunications network, a wireless signal corresponding to a data input, the base station comprising:
  circuitry configured to
    generate, from the data input, a quadrature signal comprising a real component "I" signal and an imaginary component "Q" signal, the I and Q signals providing In and Qn values for each transmission unit n of a plurality of transmission units;
    rotate the quadrature signal by an angle to provide signal space diversity thereby generating rotated I and Q signals; and
    interleave the rotated I and Q signals to leave a gap of at least L transmission units between corresponding In and Qn values for each of the transmission units n of the plurality of transmission units, wherein L is selected to be equal to or greater than an expected maximum size, measured in transmission units, of a possible colliding wireless signal.

11. Circuitry for a terminal for receiving a wireless signal in a mobile telecommunications system, wherein the circuitry is configured to:
  receive, from a wireless interface, a combined complex signal sent using a plurality of transmission units;
  split the complex signal into a real component "I" signal and an imaginary component "Q" signal, the split I and Q signals providing $1_n$ and $Q_n$ values for each transmission unit n of a plurality of transmission units;
  de-interleave the split I and Q signals to reverse an interleaving function to generate de-interleaved I and Q signals, wherein the de-interleaving is configured to re-order the split $1_n$ and $Q_n$ values to recover pre-interleaving I and Q signals, wherein
  the interleaving function introduces a gap of at least L transmission units between corresponding pre-interleaved $1_n$ and $Q_n$ values for each of the transmission units and wherein L is selected to be equal to or greater than an expected maximum size, measured in transmission units, of a possible colliding wireless signal.

12. The circuitry of claim 11, wherein the circuitry is configured to apply a reverse modulation and rotation function to each of the de-interleaved I and Q signals to recover a data input used for generating the combined complex signal received via the wireless interface.

13. The circuitry of claim 12, wherein applying a reverse modulation and rotation function includes pulse amplitude modulation "PAM" de-mapping each of the de-interleaved I and Q signals to recover original bits in modulated symbols used for generating the signal received as the combined complex signal to generate log-likelihood ratios of the original bits for each of the de-interleaved I and Q signals.

14. The circuitry of claim 13, wherein the circuitry is configured to combine the log-likelihood ratios for each of the de-interleaved I and Q signals into a combined log likelihood ratio combiner to attempt to recover the data input.

15. The circuitry of claim 11, wherein the circuitry is configured to receive an indication of a plurality of transmission units where the combined complex signal was affected by a colliding wireless signal.

16. The circuitry of claim 15, wherein applying a reverse modulation and rotation function includes, for each value of the de-interleaved I and Q signals that was transmitted in one of the plurality of transmission units, applying a reverse modulation and rotation function where the each value is associated with a low certainty or is replaced with a zero value.

17. The circuitry of claim 11, wherein the circuitry is configured to:
   receive the parameter L from a network element; and
   de-interleaving the split I and Q signals based on the received L parameter.

18. The circuitry of claim 11, wherein a transmission unit is a resource element.

\* \* \* \* \*